United States Patent Office 3,117,946
Patented Jan. 14, 1964

3,117,946
COMPOSITIONS COMPRISING ETHYLENE HOMO-
POLYMER AND ETHYLENE-STYRENE COPOLY-
MER AND METHOD OF PREPARING SAME
William F. Gorham, Berkeley Heights, and Alford G. Farnham, Mendham, N.J., assignors to Union Carbide Corporation, a corporation of New York
No Drawing. Filed Jan. 4, 1960, Ser. No. 37
9 Claims. (Cl. 260—45.5)

This invention relates to thermoplastic compositions comprising a homopolymer and a copolymer of ethylene. More particularly the invention relates to thermoplastic compositions which are more easily processable into useful shapes than ethylene compositions heretofore known and which provide articles characterized by excellent long term stress rupture resistance and strength properties.

Ethylene homopolymer having a density above about 0.95 has a number of highly desirable properties, such as excellent moisture resistance and good rigidity, and strength superior to lower density ethylene homopolymer. Not all the properties of higher density ethylene homopolymers are desirable, however. A chief disadvantage is the limited number of ways in which it is feasible to mold or shape the polymer for, while the homopolymer lends itself readily to injection molding, a lack of hot strength and a tendency to stick to calendering rolls precludes processing on such rolls or in extruders and, hence, narrows the range of shapes and structures available and restricts the use of the homopolymer with all its advantages to comparatively few fields and types of products.

Also, these ethylene homopolymers having a density about 0.95 exhibit a tendency to buckle severely when a hot calendered sheet is cooled. Extruded higher density ethylene homopolymer pipe is adequate in burst strength for such applications but possesses poor thermal embrittlement characteristics in long term stress rupture tests.

A polymeric material offering many of the desirable properties of ethylene homopolymer can be produced by copolymerizing ethylene with styrene. The copolymerization can be carried out by heating the monomers together, under a slight positive pressure in the presence of a catalyst. The ethylene-styrene copolymer thus produced, however, has a very high molecular weight as indicated by a 10 P melt flow at 250° C. of less than 2.0 decigrams per minute. As a result, the copolymer cannot be successfully calendered into usable sheets. A calendered sheet of ethylene-styrene copolymer is rough surfaced, internally irregular, and nonuniform and generally unattractive and unsalable. Ethylene-styrene copolymer is not useful in extruded pipe applications either, since it lacks both adequate burst strength and long term resistance to stress rupture.

The broadening of the area of application of higher density ethylene homopolymer and copolymer has been retarded by their lack of adaptability to a variety of processing techniques and/or poor strength properties, both immediate and long term.

It is an object, therefore, of the present invention to provide a thermoplastic composition which is free of the limitations heretofore associated with ethylene homopolymer and/or copolymer.

This and other objects of the present invention are achieved by thermoplastic compositions comprising ethylene homopolymer in intimate admixture with ethylene-styrene gross copolymer. These thermoplastic compositions comprise 20 to 75 weight percent of ethylene homopolymer and 80 to 25 weight percent of ethylene-styrene gross copolymer. The compositions are readily processed by either calendering or extrusion methods. This is unexpected in view of the poor calendering and extrusion properties of the component homopolymer and copolymer individually.

The blends herein described, particularly those comprising 20 to 60 weight percent ethylene homopolymer are excellent calendering materials. They possess the requisite degree of hot strength on the rolls and are easily stripped from the rolls. These materials can be rolled into strong, light, tough, heat-resistant sheet admirably suited for vacuum forming and embossing applications.

Also, the blends of the invention have a combination of properties which makes them superior compositions for extruded pipe and similar extrusion applications. In particular, the blends comprising 25 to 75 weight percent ethylene homopolymer exhibit both high instantaneous burst strength and excellent long term stress rupture characteristics and good resistance to thermal embrittlement.

In the present specification and claims the term "gross copolymer" refers to a styrene and ethylene product containing at least 20 weight percent copolymerized styrene and fractionable into several copolymer fractions, one of which is insoluble in toulene, heptane, chloroform and cyclohexane and comprises 50 to 75 weight percent of the gross copolymer. The term "copolymer fraction" is used to denote a portion of the gross copolymer, characterizable by solubility behavior, reduced viscosity and copolymerized styrene content at a given copolymerized styrene content for the gross copolymer.

The blends of ethylene homopolymer and copolymer of the present invention can be prepared by any of the procedures ordinarily used to mix or compound polyethylene resin compositions. The ethylene homopolymer and copolymer can be mixed or blended together in a differential-speed multi-roll mill, Marshall mill or like shear-producing apparatus. It is critical to carry out at least a portion of the mixing or blending at a temperature high enough to flux the polymers, usually about 140° C. to 300° C. and preferably 150–180° C. to achieve an adequately uniform, intimately admixed composition. Elevated temperature processing is conveniently carried out in a Banbury mixer or heated mill. It is practicable to combine the mixing and intimate blending operation with the forming operation in an apparatus such as a compounding extruder. The homopolymer and copolymer components can be blended by pumping one into the other while both are viscous, fluxed fluids.

At the time of blending or at any other time conventional additives, modifiers, colorants, lubricants, opacifiers, fillers and the like can be added to the composition of this invention.

The styrene-ethylene copolymers, which can be intimately admixed with the above ethylene homopolymers to provide the advantageous compositions of the present invention, are narrowly critical. Only ethylene-styrene copolymers having properties as hereinafter set forth are useful in the blends of this invention.

The gross copolymers useful in the invention can be characterized by solubility characteristics in heptane, cyclohexane, chloroform and/or toluene. The gross copolymers are fractionably solubilizable into four fractions of varying copolymerized styrene content and varying solubility and reduced viscosity characteristics by successive extractions with the above-listed solvents and in that order.

The percent copolymerized styrene content in the above copolymers should be at least 20% by weight. From the standpoint of strength and general balance of properties imparted to the final blended composition, as well as compatibility with the ethylene homopolymer, copolymers containing from about 20% up to about 50% by weight copolymerized styrene and hence 80% to 50% by weight copolymerized ethylene are best suited for use in the compositions of this invention.

Particularly useful ethylene-styrene copolymers, which are preferred in our inventive compositions are those made by copolymerizing ethylene and styrene with a crystalline titanium trichloride (purple form) and a trialkyl aluminum compound having up to four carbon atoms in each alkyl group, as for example, triisobutyl aluminum, suspended in an inert hydrocarbon solvent.

These styrene-ethylene gross copolymers are preferably prepared as follows:

To a solution of styrene monomer in an inert organic solvent is added a catalyst mixture consisting essentially of crystalline titanium trichloride (purple form) and a trialkyl aluminum compound wherein each of the alkyl groups contains up to four carbon atoms. The particle size of the crystalline titanium trichloride can be reduced to increase the catalytic activity, if desired.

The catalyst components are mixed in an approximately equimolar ratio, i.e. 1:2 to 2:1 of one to the other in an inert organic solvent. An equimolar ratio of crystalline $TiCl_3$ and triisobutyl aluminum suspended in heptane is preferred. The total amount of catalyst employed in the reaction can be varied from about 5 to about 40 millimoles of catalyst per liter of styrene/solvent solution. Catalyst concentration of about 20 millimoles per liter of a 20% by weight solution of styrene in cyclohexane is preferred.

Prior to addition of ethylene, the above-described styrene/solvent/catalyst reaction mixture is agitated rapidly, as by an impeller, and heated to a temperature of about 65–75° C. Ethylene is then sparged into the heated, agitated reaction mixture at a pressure of from about 2 to 10 pounds/sq. in. gauge, depending on the amount of copolymerized ethylene desired in the final product, with higher pressures providing gross copolymers having a higher copolymerized ethylene content. Ethylene addition is continued until the build-up of polymer, evidenced by a great increase in reaction mixture viscosity, makes agitation difficult. Under the reaction procedure set forth above, a period of seven to fourteen hours is generally sufficient to form a styrene-ethylene copolymer suitable for use in the compositions of the present invention.

The reaction is stopped by addition of an alcohol such as n-butanol in an amount approximately equal to the volume of the reaction mixture. Styrene and cyclohexane are removed from the reaction product by any suitable means, such as azeotropic distillation with n-butanol acting as a carrier. The resulting slurry of styrene-ethylene gross copolymer in n-butanol is filtered by centrifugation, washed with isopropanol or the like and dried, suitably at atmospheric or reduced pressures and temperatures of about 70° C. for a period of about twelve hours.

Styrene-ethylene gross copolymers produced by the above-described reaction are usually extremely high molecular weight materials. To be suited to use in calendering, molding and extrusion apparatus, it is essential that the composition of this invention contain as the copolymer component, a styrene-ethylene copolymer having a 10 P melt flow at 190° C. of 1–10 decigrams per minute. Lower melt flow copolymers, i.e., below about 1 decigram/minute are too stiff to be successfully incorporated in the blends. Melt flows higher than about 10 decigrams/minute are characteristic of copolymers having insufficient toughness to be useful in the blends.

"10 P" melt flow is a standard test for indicating molecular weight of plastics and is described under ASTM designation #1238–57T.

Copolymers of styrene and ethylene produced by the reaction hereinabove described which are too high in molecular weight to meet the above requirements can be processed by pyrolysis, such as in a hot tube or extruder at temperatures between 300° C. and 400° C. in order to partially decompose the copolymer in a controllable manner. In essence, the processing comprises a controlled reduction of molecular weight through thermal means and makes possible extrusion, molding and calendering of extremely high molecular weight products of certain polymerization reactions.

The ethylene homopolymers useful in the blends of the present invention are any of the commercially available polyethylenes having densities in the range of about 0.92 to about 0.96 and a melt index in the range of about 0.1 to about 10. Ethylene homopolymer below the lower limit is unable to impart any useful physical or strength properties to the blend. Ethylene homopolymer above the upper limit is too brittle to be useful in the blends. The blends of the invention are most advantageous with higher density ethylene homopolymers because the advantageous strength properties are retained and thermal embrittlement is substantially reduced.

In order to illustrate the practice of our invention, the following examples are presented. All parts and percentages are by weight, unless stated otherwise.

EXAMPLE I

A. *Preparation of the Ethylene-Styrene Copolymer*

The apparatus was a 350 gallon autoclave equipped with an agitating propeller and a sparging tube. Into the apparatus was placed 1120 pounds of heptane and 370 pounds of styrene monomer. A catalyst consisting of 900 grams of crystalline titanium trichloride and 1800 grams of triisobutyl aluminum was added. Agitation and heating was then begun. When a temperature of 65–75° C. was reached ethylene was sparged into the vessel beneath the surface of the styrene solution under a pressure of one pound/sq. in. gauge. Ethylene addition was continued in this manner for nine hours with the temperature maintained at 70° C. Total ethylene charged during this period was 162 pounds.

To stop the reaction an approximately equal volume of n-butanol was added to the reaction mixture. The unreacted styrene, heptane and n-butanol were distilled off as an azeotrope at atmospheric pressure. The slurry of styrene-ethylene copolymer in n-butanol remaining after the distillation was centrifuged and the obtained copolymer precipitate was washed with isopropanol. The washed copolymer was spread on trays and dried in a vacuum oven (30 mm. Hg) at 70° C. for twelve hours. The yield was 210 pounds of gross ethylene-styrene copolymer which had a styrene content of 33% by infrared analysis.

B. *Preparation of the Copolymer Homopolymer Blend*

A blend comprising equal parts of the above prepared copolymer processed to a 2.6 decigram/minute melt flow at 190° C. in a hot tube and a 0.96 density polyethylene having a melt index of 0.5 was extruded into ½" pipe. Samples of the copolymer alone and the polyethylene alone were also extruded into pipe. The superiority of the blends over the copolymer alone, or polyethylene alone in this regard is shown in Table I below.

TABLE I.—STRENGTH PROPERTIES [1] OF PIPE EXTRUDED OF ETHYLENE-STYRENE COPOLYMER, POLYETHYLENE, AND BLEND THEREOF

| Material | Instantaneous Burst Strength Hoop Stress (p.s.i.) | | | | Long Term Stress Rupture (hours to failure at 60° C. under 500 p.s.i. hoop stress) |
|---|---|---|---|---|---|
| | 26° C. | 40° C. | 60° C. | 80° C. | |
| Copolymer (33% Styrene/67% Ethylene) | 2,810 | 2,330 | 1,140 | 40 | 1.5 |
| Polyethylene (0.96 density) | -------- | -------- | 1,700 | -------- | 50 |
| Blend: Copolymer; 50 parts (33% Styrene/ 67% Ethylene); 50 parts Polyethylene (0.96 Density) | 4,560 | 3,560 | 2,480 | 1,570 | 500 |

[1] ASTM #D–1180–57.

EXAMPLE II

A blend of 25 parts ethylene homopolymer (0.96 density 0.5 melt index) and 75 parts ethylene-styrene copolymer containing 33% styrene was prepared and calendered using ½% zinc stearate and ½% stearic acid as lubricants. Sheeting was obtained which was readily embossed with either shallow or deep patterns, and vacuum formed with either male or female forms into a number of shapes, e.g., milk bottle tops, ice cube trays, flower pots, etc. The sheeted stock was block printed with gravure and flexographic inks without need for pretreatment. Tensile strength of the blend was 3050 pounds/sq. inch; elongation was 350%; and tensile impact strength was 103 ft. lbs./cubic inch.

To demonstrate the fractionable nature of the gross styrene-ethylene copolymers useful in the compositions of the present invention, gross copolymers prepared as in Example I and containing 50, 40 or 30% copolymerized styrene were fractionated by a successive extraction technique into four copolymers A, B, C and D. The extraction was carried out by placing a 5.00 gram sample of each gross copolymer in a thimble filter suspended below a reflux condenser attached to a 250 ml. flask containing 100 ml. of the desired solvent. The vapors of the boiling solvent passed around the thimble filter, were condensed in the condenser and dripped back into the flask through the sample. Thus, the extracted copolymer collects in the flask, as fresh solvent vaporizes to continue the extraction. Extraction was carried out with each solvent for a period of 24 hours, after which the extracted polymer was precipitated by addition of methanol to the solution. After filtering, washing with isopropanol and drying at reduced pressure (30 mm. Hg) at 70° for twelve hours, the copolymer was analyzed for copolymerized styrene content by infrared methods. Extractions of each sample were carried out successively with heptane, cyclohexane, and chloroform. Amounts of copolymer extracted with each of the solvents are given below in Table II.

TABLE II

| Example | Percent Styrene in Copolymer | Percent Soluble Copolymer | | | Percent Insoluble Copolymer |
|---|---|---|---|---|---|
| | | (A) | (B) | (C) | (D) |
| 1 | 50 | 13 | 31 | 26 | 26 |
| 2 | 40 | 6 | 10 | 17 | 67 |
| 3 | 30 | 4 | 7 | 17 | 74 |

| Fraction | Reduced Viscosity (Toluene) | Percent Styrene | Heptane | Cyclohexane | Chloroform |
|---|---|---|---|---|---|
| A | 0.6–1.2 | 40–55 | Soluble | Soluble | Soluble. |
| B | 1.0–1.8 | 75–90 | Insoluble | do | Do. |
| C | 2.0–4.0 | 90–100 | do | Insoluble | Do. |
| D | | 10–20 | do | do | Insoluble. |

Preferred gross copolymers in terms of copolymerized ethylene content and the fractions present therein are those containing from 25 to 40% by weight copolymerized styrene and which have from 7 to 11% by weight of "A" fraction copolymer (soluble in heptane, cyclohexane, chloroform and toluene); from 7–15% by weight of "B" fraction copolymer (soluble in cyclohexane, chlorohexane, chloroform and toluene and insoluble in heptane); from 12 to 20% by weight of "C" fraction copolymer (soluble in chloroform and toluene and insoluble in heptane and cyclohexane; and from 50–75% by weight of "D" fraction copolymer, soluble in ethylbenzene and chlorobenzene and insoluble in heptane, cyclohexane, chloroform and toluene. The use of the gross copolymer rather than one or more fractions thereof only is critical in achieving the advantageous properties of the blends of the invention. Use of toluene soluble fractions only blended with polyethylene results in brittle, unworkable compositions. On the other hand, use of the toluene insoluble fraction only is not feasible since that fraction is not compatible with polyethylene.

The utility of the above described blends is obvious from the above description of their salient features, good resistance to thermal embrittlement, easy processability and excellent strength properties. Typical uses are as extruded pipe, film, and wire insulation, and calendered sheet.

What is claimed is:

1. A readily processable thermoplastic composition comprising per 100 parts by weight from 20 to 75 parts by weight of ethylene homopolymer having a melt index of less than about 10 and a density from 0.92 to 0.96 blended with from 80 to 25 parts by weigh of a fractionable styrene-ethylene copolymer having a 10 P melt flow at 190° C. of from 1 to 10 decigrams per minute and containing at least 20% copolymerized styrene, one fraction of said copolymer being insoluble in toluene and comprising 50 to 75% by weight of said copolymer.

2. A readily processable thermoplastic composition comprising per 100 parts by weight from 20 to 60 parts by weight of ethylene homopolymer having a melt index from 0.1 to 10 and a density of from 0.92 to 0.96 blended with from 80 to 40 parts by weight of a fractionable styrene-ethylene copolymer having a 10 P melt flow at 190° C. of from 1 to 10 decigrams per minute and containing from 20 to 50% copolymerized styrene, one fraction of said copolymer being insoluble in toluene and comprising from 50 to 75% by weight of said copolymer; a second fraction insoluble in heptane and cyclohexane and soluble in chloroform and toluene; a third fraction insoluble in heptane and soluble in cyclohexane, chloroform and toluene; and a fourth fraction soluble in heptane, cyclohexane, chloroform and toluene.

3. The composition claimed in claim 1 wherein said composition comprises per 100 parts by weight 25–75 parts by weight of said ethylene homopolymer and from 75–25 parts by weight of said copolymer.

4. The composition claimed in claim 3 wherein the copolymerized styrene content of the copolymer is from 30 to 50% by weight.

5. Method for producing readily processable thermoplastic compositions which includes the steps of preparing a fractionable styrene-ethylene copolymer having a 10 P melt flow at 190° C. of from 1 to 10 and containing from 20 to 50% by weight copolymerized styrene by reacting together styrene and ethylene in the presence of a catalyst consisting of crystalline titanium trichloride and an alkyl aluminum compound wherein each alkyl group contains up to four carbon atoms, and blending the thus-prepared copolymer with ethylene homopolymer having a melt index of from about 0.1 to 10 and a density of from 0.92 to 0.96 in a ratio per 100 parts by weight of the blend of from 80 to 25 parts by weight of the copolymer to from 20 to 75 parts by weight of the ethylene homopolymer under shearing conditions at a temperature between about 140° C. and 300° C.

6. The method claimed in claim 5 wherein from 80 to 40 parts by weight of said copolymer is blended with from 20 to 60 parts by weight of said ethylene homopolymer.

7. The method claimed in claim 5 wherein from 75 to 25 parts by weight of said copolymer is blended with from 25 to 75 parts by weight of said ethylene homopolymer.

8. The method claimed in claim 7 wherein the said ethylene homopolymer has a melt index of 0.5 and a density of 0.96 and is blended at a temperature between 150 and 180° C.

9. Method for producing readily processable thermoplastic compositions which comprises fluxing together per 100 parts by weight of the composition 20 to 75 parts by weight of ethylene homopolymer having a melt index of from about 0.1 and 10 and a density of 0.92 to 0.96 and 80 to 25 parts by weight of a copolymer of ethylene and styrene which has a 10 P melt flow between 1 and 10 at 190° C. and contains 20 to 50% copolymerized styrene, said copolymer being fractionable into a first copolymer fraction insoluble in toluene and comprising 50 to 75 weight percent of the copolymer; a second copolymer fraction insoluble in heptane and cyclohexane and soluble in chloroform and toluene; a third copolymer fraction insoluble in heptane and soluble in cyclohexane, chloroform and toluene; and a fourth copolymer fraction soluble in heptane, cyclohexane, chloroform and toluene.

References Cited in the file of this patent

UNITED STATES PATENTS

| | | |
|---|---|---|
| 2,563,631 | Young et al. | Aug. 7, 1951 |
| 2,824,089 | Peters et al. | Feb. 18, 1958 |
| 2,994,691 | Gates | Aug. 1, 1961 |

FOREIGN PATENTS

| | | |
|---|---|---|
| 538,782 | Belgium | Dec. 6, 1955 |